United States Patent [19]
Akeley

[11] 3,735,639
[45] May 29, 1973

[54] GAUGE PRESSURE TRANSMITTER WITH INTERCHANGEABLE RANGE ELEMENTS AND RUPTURE PROTECTION

[75] Inventor: Lloyd T. Akeley, Fullerton, Calif.
[73] Assignee: Beckman Instruments, Inc., Fullerton, Calif.
[22] Filed: Apr. 17, 1972
[21] Appl. No.: 244,547

[52] U.S. Cl. ..................... 73/398 R, 92/98, 336/30
[51] Int. Cl. ............................................. G01l 9/10
[58] Field of Search ................... 73/398 R, 398 C, 73/406, 407 R; 336/30; 92/98

[56] References Cited
UNITED STATES PATENTS

| | | | |
|---|---|---|---|
| 3,161,059 | 12/1964 | Burggren | 73/398 R |
| 3,303,447 | 2/1967 | Nevius | 336/30 |

*Primary Examiner*—Donald O. Woodiel
*Attorney*—James M. Thomson and Robert J. Steinmeyer

[57] ABSTRACT

A gauge pressure transmitter for producing an electrical output signal proportional to an inlet fluid pressure. The transmitter includes a sensor assembly having a central chamber therein communicating with an inlet fluid manifold. A diaphragm is secured across the inlet fluid manifold at the head of a central chamber and a sleeve and spring are positioned within the chamber, acting against the diaphragm, to oppose movement of the diaphragm responsive to inlet fluid pressure. The cores and windings of a position responsive transducer are mounted within the central chamber and the armature of the transducer is supported upon a shaft that extends centrally of the chamber and is attached at one end to the spring. An O-ring is provided in a gap between the sleeve and spring, upstream of a shoulder on the spring, so that fluid discharged into the gap, such as might occur upon rupture of the diaphragm, drives the O-ring against the shoulder and seals off further flow of the pressure fluid. The spring, sleeve and diaphragm are confined by a removable pressure body to enable major change of the transmitter pressure range by use of springs having different resiliences.

6 Claims, 1 Drawing Figure

PATENTED MAY 29 1973 3,735,639
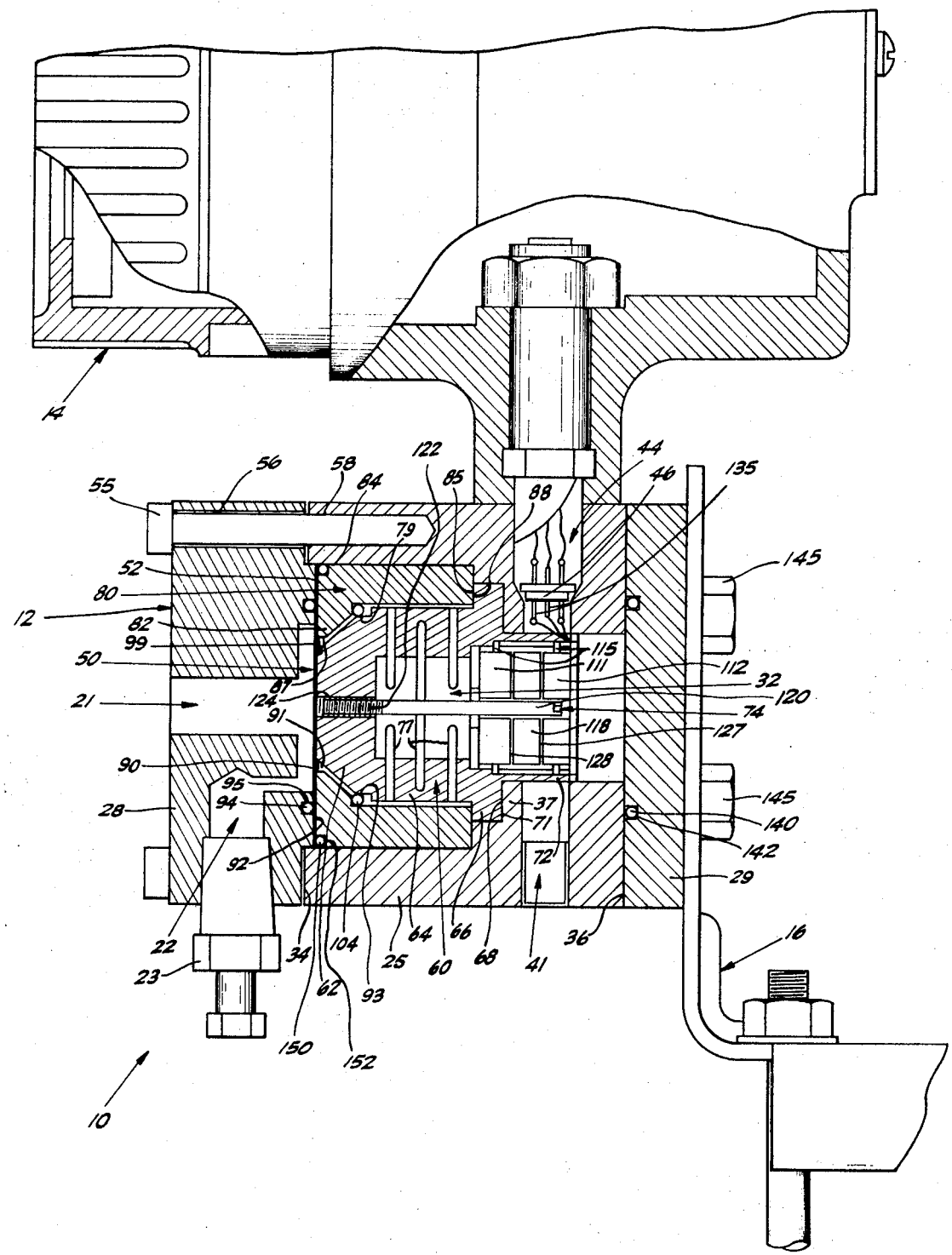

GAUGE PRESSURE TRANSMITTER WITH INTERCHANGEABLE RANGE ELEMENTS AND RUPTURE PROTECTION

BACKGROUND OF THE INVENTION

The present invention relates to a gauge pressure transmitter of the type having a sensing diaphragm and transducer that is adapted to produce an electrical output signal proportional to inlet fluid pressure. More particularly, the invention relates to such a gauge pressure transmitter including diaphragm rupture protection means, that is adapted for convenient use with inlet fluid pressures varying over a substantial range.

Various pressure transmitters utilizing inductive principles are known in the prior art. Such transmitters can be of the gauge pressure type, adapted to produce an electrical output signal proportional to a single source of inlet fluid gauge pressure, or they can comprise differential pressure transmitters adapted to produce an electrical output signal responsive to the difference between two sources of inlet fluid pressure. In either case, the transmitters usually include at least one diaphragm adapted to move in response to the inlet fluid pressure and also include position responsive transducer means which is adapted to move in response to the diaphragm movement. In the case of a gauge pressure transmitter, the diaphragm must be balanced or calibrated against atmospheric pressure on its low side so that diaphragm motion will be proportional to inlet pressure, minus atmospheric pressure.

A spring has a limited range of force capability. Accordingly, use of a spring as a biasing means for the diaphragm has limitations where a given instrument is to be used for measuring inlet fluid pressures varying over wide ranges. Other disadvantages arise in the use of instruments of this general type, since the inner chamber of the instrument acts as a housing for the transducer elements and these elements are separated from the inlet fluid manifold only by the diaphragm, which is usually constructed of thin metal or other flexible material subject to rupture. In the event that a tear or rupture does occur in the diaphragm, the inner works of the transmitter can be subjected to the pressure fluid which may result in corrosion and other damage thereto. Also, the leakage of fluid through the diaphragm obviously can result in loss of expensive fluid and possibly damage in the area near the transmitter if the rupture is not immediately detected and repaired.

SUMMARY OF THE INVENTION

Accordingly it is an object of the invention to provide an improved gauge pressure transmitter for producing an electrical output signal proportional to inlet fluid pressure, which overcomes the above-mentioned disadvantages in prior art transmitters.

It is another object of the invention to provide a gauge pressure transmitter which includes an easily replaceable sleeve, spring and diaphragm assembly which enables easy modification of the responsive range of the transmitter by exchange of these elements.

It is a further object of the invention to provide a gauge pressure transmitter which includes diaphragm rupture protection means between the diaphragm and central chamber of the instrument, effective upon flow of significant amounts of pressure fluid through the diaphragm.

It is yet another object of the invention to provide a gauge pressure transmitter having such rupture protection means wherein the output of the transmitter changes drastically upon rupture of the diaphragm so that the rupture is easily detected.

These objects and advantages of the invention are attained in a gauge pressure transmitter which includes a housing having a central chamber formed therein communicating with an inlet fluid manifold. A diaphragm of flexible material is positioned across the inlet fluid manifold and a sleeve and spring assembly are positioned within the central chamber, the spring acting against the diaphragm to oppose movement of the diaphragm responsive to inlet fluid pressure. Cores and windings of a position responsive transducer are mounted within the chamber and an armature is supported upon a shaft extending centrally of the chamber and having one end secured to the spring. An O-ring is provided in a gap between the spring and sleeve, upstream of a shoulder defined in the spring to form a seat for the O-ring. In the event of diaphragm rupture, pressure fluid discharged into the gap forces the O-ring against the shoulder forming a seal to prevent further fluid flow into the internal chamber and to the area outside the transmitter. The effective area of the O-ring is double the effective area of the diaphragm. Therefore, rupture of the diaphragm results in an effective doubling of the instrument output which is thereby easily apparent to the operator. The spring, sleeve and diaphragm are retained beneath a removable pressure body to facilitate exchange of the spring for another spring of different resilience to drastically modify the transmitter pressure response range.

BRIEF DESCRIPTION OF THE DRAWINGS

The above objects and other features and advantages of the invention will become apparent from the following detailed description of the invention taken in conjunction with the accompanying drawings wherein:

The FIGURE is a diagrammatic view in partial secton of one embodiment of the invention.

DETAILED DESCRIPTION OF THE INVENTION

Referring now to the drawing one preferred embodiment of the invention is illustrated comprising a gauge pressure transmitter 10 including a sensor assembly 12 to which an amplifier and meter housing 14 and a mounting bracket 16 are secured. Housing 14 confines the inner works of an amplifier and a meter movement of conventional design. The amplifier is adapted to excite and to receive the electrical output signal of a position responsive transducer within the transmitter, amplify the output signal and convert it to a current output signal for remote indication or control. Mounting bracket 16 is adapted to secure the transmitter to a convenient support, such as a vertical or horizontal pipe mount.

The sensor assembly is provided with a fluid pressure inlet duct 21 and a fluid duct 22 closed by a drain plug 23. Pressure to be measured can be introduced at inlet duct 21 or at duct 22. In the latter instance plug 23 would be shifted to close duct 21. The pressure piping is not illustrated. However it should be understood that any convenient means of providing fluid pressure to the transmitter can be utilized.

The internal structure of the sensor assembly 12 is generally confined within a transducer body 25, between a removable pressure body 28 and a removable cover 29.

Transducer body 25 has a generally cylindrical inner chamber 32 extending therethrough between a left face 34 and a right face 36. An inwardly extending ring 37 is formed about the periphery of chamber 32, forming a partial constriction near the right end of the chamber for a purpose apparent hereinafter. An atmospheric vent channel 41 is formed at the bottom of the transducer body 25 and an access opening 44, closed by a removable electrical header 46, is provided through the top of the transducer body.

Fluid inlet duct 21 is formed through the center of pressure body 28 and is threaded for connection with a suitable inlet fluid tube or pipe. The inner end of duct 21 flares into an inlet manifold 50 located adjacent the central chamber of the transducer body. Fluid duct 22 also communicates with manifold 50. Plug valve 23, shown in duct 22, may be opened to drain process fluid and possible dirt accumulation from the inlet face of the diaphragm.

A face 52 of body 28 is defined about the periphery of the manifold opening. Body 28 is retained by bolts 55 extending through openings 56 in the body and engaging threaded holes 58 formed in face 34 of the transducer body.

A spring 60 of generally cylindrical configuration is supported within central chamber 32 of the transducer body. Spring 60 has a tapered nose 62, a hollow central section 64, and an outer ring 66 having a surface 68 which is adapted to fit against a surface 71 of shoulder 37 which acts as a support for the spring. Spring 60 otherwise includes a skirt 72 extending from ring 66 to define a transducer housing 74.

The wall of the central section of the spring has elongate slots 77 formed therein at selected spacings. Each of the slots extends around approximately three eights of the periphery of the spring and alternate slots are shifted 90° so that an arrangement of overlapping slots is formed. The spring is made of a suitable material, such as steel, so that a resilient, compressible spring or spring structure results from the slot configuration.

Nose 62 is of a slightly smaller diameter than the end of central section 64 of the spring. Accordingly, a shoulder 79 is defined about the periphery of the end of the central section for a purpose explained hereinafter.

A hollow cylindrical sleeve 80 is also provided within chamber 32 surrounding spring 60. The gap between sleeve 80 and body 25 is sealed by an O-ring 150 in a gap 152 formed in the sleeve. Sleeve 80 has an edge 85 adapted to seat against a surface 88 of ring 66. The sleeve is partially closed at its upper end by an inner shoulder 82 having a flat upper surface 84.

Due to the controlled length of sleeve 80 and spring 60, flat upper surface 84 of sleeve 80 and the face of spring 60 form a support table for a diaphragm 90.

Diaphragm 90 comprises a thin, circular, flexible disk of conventional design having a continuous outer edge 92 which is firmly engaged and clamped between face 84 of sleeve 80 and face 52 of body 28. The diaphragm may be made of corrosion-resistant stainless steel or any other suitable flexible isolating material. An O-ring 94 is retained in a recessed channel 95 formed in face 52, and is firmly engaged against the diaphragm to form a seal between pressure body 28 and diaphragm 90.

A recessed face 87 is formed about the inner periphery of shoulder 82 of sleeve 80 and a corresponding recessed face 99 is formed about the upper end of nose 62 of the spring 60. The recessed faces cooperate to form a circular depression or channel just beneath the diaphragm which defines the effective operating area of the diaphragm.

A gap 91 exists between the outer surface of spring 60 and the inner surface of sleeve 80, which gap includes an enlarged chamber 93 formed adjacent shoulder 79. Chamber 93 is partially filled by an elastomeric O-ring 104 generally surrounding but not firmly contacting the tapered portion of nose 62 above shoulder 79. The O-ring is of a suitable diameter so that pressure exerted upon it by fluid flowing through gap 91 will force the O-ring down against shoulder 79 thereby forming a fluid tight seal in the gap. However, in the absence of fluid flow the O-ring is positioned above the shoulder and therefore does not firmly engage spring 60.

A pair of transducer core-coils, 111 and 112 of circular configuration are supported within housing 74 by suitable means, such as shims 115 wedged between the outer edge of the cores and the side surfaces of the recess. The coil windings are interconnected by conductors not illustrated to produce a differential output signal. The transducer cores are spaced apart about an armature 118 which is secured to a shaft 120 extending longitudinally through the central part of chamber 32. Shaft 120 has a threaded end 122 that engages a corresponding threaded hole 124 formed in the nose 62 of the spring. Operating air gaps 127, 128 exist between moving armature 118 and fixed core-coils 111, 112 respectively. Accordingly as shaft 120 moves the gaps between the armature and the core-coils change. This results, in well known fashion, in a change of the magnetic flux linkage between the windings so that the output of the transducer comprises an electrical signal proportional to the movement of shaft 120.

The transducer primary and secondary windings are connected, via conductors 135 extending through header 46 to the amplifier within housing 14.

An O-ring 140 is retained between cover 29 and surface 36 of the transducer body 25 in a recessed channel 142 formed in cover 29. The O-ring is compressed, under the force of retaining screws 145 extending through suitable openings in cover 29 and engaging threaded holes formed at spaced intervals around the inner periphery of the main body, and acts as a seal between the faces.

The central cavity around the transducer may be filled with a damping fluid, such as a noncorrosive oil, although this is not required. In that event the bottom drain opening 41 would be closed or its position shifted to the top of body 25.

In operation, the gauge pressure transmitter described herein is responsive to inlet fluid of varying pressures. Such variations result in movement of the diaphragm and corresponding displacement of spring 60 and shaft 120. These changes alter the relative position of the armature with respect to the core-coils and cause an output signal from the transducer which is proportional to the inlet fluid pressure.

The resilience of spring 60, and the atmospheric pressure in the internal chamber provide a reference force acting in opposition to the inlet pressure. Accordingly by selection of a spring of proper resilience and by adjustments in the amplifier, transmitter current output can be adjusted to represent a desired range of gauge pressure. Adjustment in the amplifier allows approximately a 5 to 1 range adjustment, all within the capability of a particular spring and diaphragm. For example one combination will accommodate a full-span pressure range of 0–10 to 0–50 psig. Use of a stiffer spring will accommodate a full-span pressure range of 0–30 to 0–150 psig, etc. Accordingly in order to facilitate the use of the transmitter to monitor inlet fluid pressures of different ranges, it is possible, with the transmitter shown, to remove pressure body 28 and replace spring 60 and its transducer with a spring and transducer having a different resilience. Consequently the range of the instrument can be arbitrarily altered for the desired use.

In the event that the diaphragm should rupture while the transmitter is operating, fluid will be admitted to gap 91. Fluid flow past the restrictive O-ring 104 will force the O-ring against shoulder 79, thereby sealing the gap. Furthermore, since the O-ring has twice the effective area of the diaphragm, an immediate change in the amount of movement of shaft 120 for a given inlet fluid pressure will result. This causes a doubling in the output of the transmitter which is easily apparent to the operator, thereby indicating that diaphragm rupture has occurred.

We claim:

1. A gauge pressure transmitter for producing an electrical output signal proportional to fluid inlet pressure comprising a sensor assembly with a central chamber therein communicating with a fluid inlet manifold, and a resilient diaphragm secured across the fluid inlet manifold at the upper end of the central chamber responsive to inlet fluid pressure,
   a sleeve and spring positioned within the chamber, the spring having a nose acting against the diaphragm to oppose movement of the diaphragm in response to inlet fluid pressure,
   transducer means associated with said spring responsive to movement of said diaphragm, and
   sealing means disposed in a gap between the sleeve and the spring for forming a seal therein in response to movement of fluid past said diaphragm.

2. The gauge pressure transmitter of claim 1 wherein said sensor assembly includes a transducer body and a removable pressure body, said transducer body having said central chamber formed therethrough and said pressure body having said fluid inlet manifold formed therein, said diaphragm having its outer edge clamped between said pressure body and said sleeve, the sleeve in turn being clamped against the spring and the spring clamped against the main body so that the spring and sleeve can be removed upon removal of said pressure body.

3. The gauge pressure transmitter of claim 2 wherein said sealing means comprises an O-ring seal extending about the nose of the spring, normally contacting only the sleeve, positioned in the gap between the sleeve and spring downstream of the diaphragm and upstream of a shoulder formed about a central section of the spring whereby passage of fluid under pressure past the diaphragm forces the O-ring into sealing engagement with said shoulder.

4. A gauge pressure transmitter for producing an electrical output signal proportional to inlet fluid pressure including a transducer body and a removable pressure body, said transducer body having a central chamber formed therethrough and said pressure body having a fluid inlet manifold formed therein,
   a resilient diaphragm secured across the fluid inlet manifold at the upper end of the central chamber, responsive to fluid inlet pressure,
   a sleeve and a spring positioned within the chamber, the spring having a tapered nose acting against the diaphragm to oppose movement of the diaphragm in response to fluid inlet pressure,
   transducer core-coil elements attached to the fixed end of the spring in the chamber and moving armature disposed in operative relationship to said fixed core-coil transducer elements and supported upon a shaft that is secured to said spring, and
   sealing means disposed in a gap between the sleeve and the spring for forming a fluid seal therein in response to the passage of fluid past said diaphragm.

5. The gauge pressure transmitter of claim 1 wherein said diaphragm has its outer edge clamped between said sleeve and said pressure body so that the spring and sleeve can be changed when said pressure body is removed.

6. The gauge pressure transmitter of claim 4 wherein said sealing means comprises an O-ring seal extending about the tapered nose of the spring, positioned in a chamber formed in the gap between the spring and sleeve, downstream of the diaphragm and upstream of a shoulder defined about a central section of the spring, whereby passage of fluid under pressure past the diaphragm forces the O-ring into sealing engagement with said shoulder.

* * * * *